March 29, 1960     A. Y. DODGE     2,930,461
ONE-WAY CLUTCHES
Filed July 18, 1952
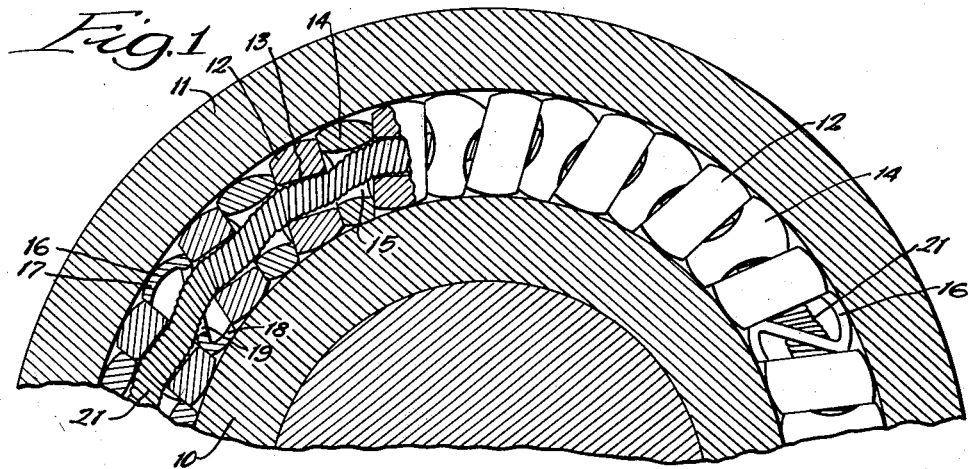
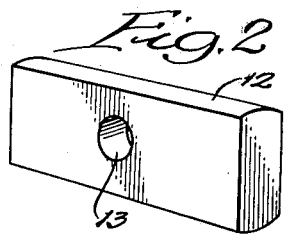
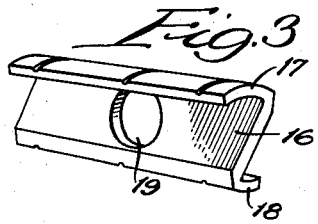
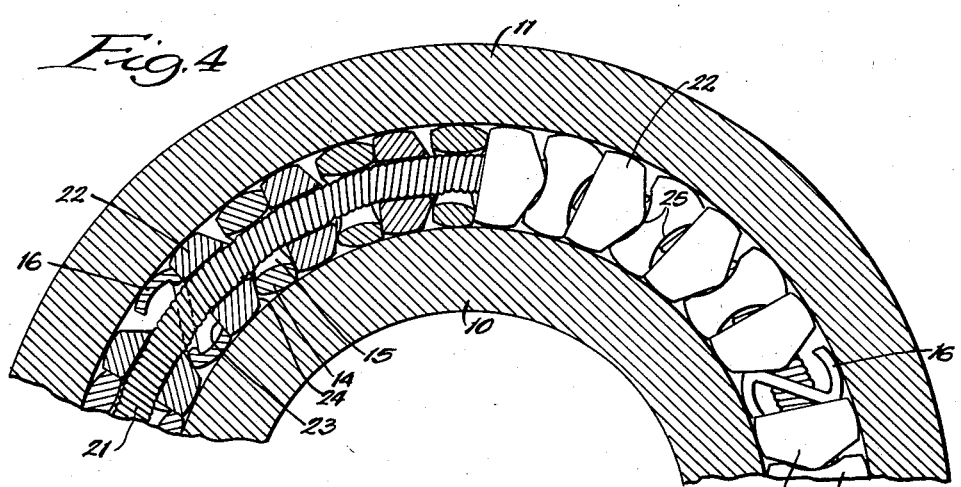
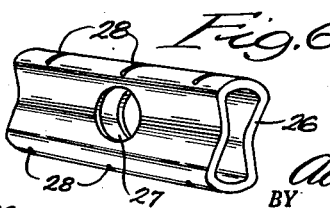
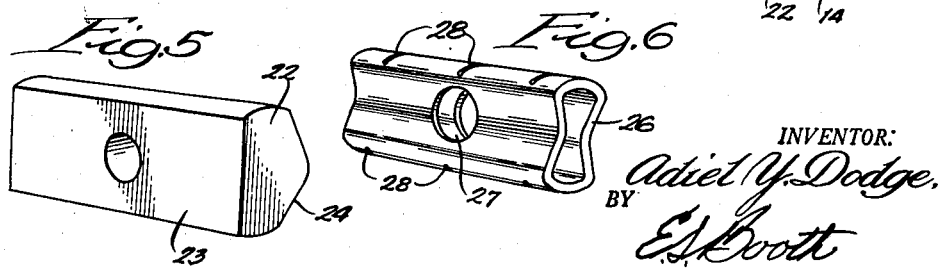
INVENTOR:
Adiel Y. Dodge,
BY
E. A. Booth
ATTORNEYS.

United States Patent Office 2,930,461
Patented Mar. 29, 1960

2,930,461
ONE-WAY CLUTCHES

Adiel Y. Dodge, Rockford, Ill., assignor to Borg-Warner Corporation, Chicago, Ill., a corporation of Illinois Application July 18, 1952, Serial No. 299,697

6 Claims. (Cl. 192—45.1)

This invention relates to one-way clutches and more particularly to one-way clutches of the tilting gripper type.

In tilting gripper type clutches, especially in applications subject to frequent torque reversals, one of the principal problems has been in control of the grippers to effect rapid and uniform engagement and disengagement thereof. This has been satisfactorily effected thru cages engaging the grippers and turned by frictional contact with the races. However, in many cases, it is desirable to avoid the use of cages to eliminate the cost thereof and the space occupied thereby.

Another problem in clutches of this type has been a provision of construction which will function as a bearing between the races during overrunning to eliminate the necessity of separate external bearings.

It is, accordingly, one of the objects of the present invention to provide a one-way clutch in which the grippers are controlled for rapid and uniform engagement without use of a cage and in which the clutch elements themselves serve as slipper bearings between the races during overrunning.

Another object is to provide a one-way clutch in which spacers are arranged alternately with the grippers and function to control the grippers and also as bearings between the races during overrunning.

According to one feature the grippers and spacers increase their circumferential dimension when tilted and nest solidly together to limit tilting and to support the spacers so that they can act as bearings during overrunning.

A further object is to provide a one-way clutch in which certain of the spacers resiliently engage the races and are constructed to provide greater friction drag against the races in the overrunning direction than in the opposite direction.

A still further object is to provide a one-way clutch in which an annular spring is threaded thru an opening in the grippers and spacers and is bent laterally by the grippers when they are tilted to their released position while not being affected by tilting of the spacers.

The above and other objects and features of the invention will be more readily apparent from the following description when read in connection with the accompanying drawing, in which:

Figure 1 is a partial transverse section with parts in elevation of a one-way clutch embodying the invention;

Figure 2 is a perspective view of a gripper;

Figure 3 is a perspective view of a resilient spacer;

Figure 4 is a view similar to Figure 1 of an alternative construction;

Figure 5 is a perspective view of one of the grippers of Figure 4; and

Figure 6 is a perspective view of an alternative spacer construction.

The clutch as shown in Figure 1 is adapted to connect an inner cylindrical race 10 to an outer cylindrical race 11 for rotation together in one direction and for free relative rotation in the opposite direction. The cylindrical surfaces of the races are spaced apart and a series of tiltable grippers 12 are arranged between them. Each of the grippers 12 has its opposite sides flat and parallel and its ends curved about circumferentially spaced centers so that when the gripper is tilted in one direction, its radial dimension will increase to bind against the races while when it is tilted in the opposite direction, its radial dimension will decrease to release the races from free rotation. The grippers are preferably formed with openings therethru which may be centrally drilled openings 13 as shown, or which may be notches formed in the ends of the grippers if desired.

The grippers are separated by a series of spacers 14 arranged alternately with the grippers. The spacers are relatively flat elements and have their opposite ends curved about a common center so that their radial dimension remains the same regardless of tilting within the limits of tilting movement in operation of the clutch. Preferably the spacers are somewhat dumbbell shaped and have their outer ends wider than their inner ends to compensate for the greater circumferential distance in the assembly adjacent to the outer race. The spacers are formed with relatively large openings 15 therethru which are of substantially greater radial extent than the openings 13 in the grippers and which register with the openings in the grippers.

Certain of the spacers, such for example, as from 3 to 6 in a complete clutch assembly may be formed of resilient Z-shaped springs as best shown in Figure 3. Such spacers, indicated at 16, have arcuate outer and inner end portions 17 and 18 respectively, which are curved about a common center and which are resiliently biased into engagement with the races. The end portions 17 and 18 extend in a direction opposite to the direction of relative movement of races during overrunning so that when the races are overrunning, the frictional effect on the resilient ends 17 and 18 tends to expand them into tighter engagement with the races. Thus, the resilient spacers will have a greater frictional effect during overrunning than when the races are turning in a direction to engage the clutch. The resilient spaces are formed with openings 19 therethru to register with the openings 13 and 15 in the grippers and spacers 14.

An annular coil spring 21 is threaded thru the several openings 13, 15, and 19 and openings 13 are of such a size and lie at such an angle that they deflect spring 21 laterally when the grippers are tilted to their disengaging position so that the spring will constantly exert a force thereon tending to tilt he grippers oward engagement. The openings 15 and 19 are large enough so that they will not engage and bend the spring, thereby to reduce stresses on the spring and to leave the spacers free to tilt solely in response to frictional force exerted thereon by the races. When the outer race tends to turn clockwise relative to the inner race, the grippers and spacers will be tilted to the position shown in Figure 1 in which the grippers disengage the races and leave them free to turn relative to each other. It will be noted that the assembly of grippers and spacers tends to increase its circumferential dimension when so tilted until the several grippers and spacers nest solidly against each other in rigid assembly. At this time, the arcuiate surfaces of the spaces 14 are in sliding engagement with the races and these spacers function as slipper bearings between the races. The spacers 14 are preferably formed of a good bearing material, for example—bronze, to reduce friction and wear during overrunning and are made rigid so that they will carry the bearing loads between the races without deflecting. The outer arcuate surfaces of the spacers are formed with oiled grooves to facilitate flow of oil and maintain proper lubrication during overrunning.

When the outer race tends to turn counter-clockwise relative to the inner race, frictional engagement of the spacer ends against the races will cause the spacers to tilt counter clockwise immediately. Through engagement of their end portions with the end portions of the grippers, the spacers will turn the grippers rapidly in a counter-clockwise engaging direction until the grippers engage and driveably connect the races. In this way rapid and uniform movement of the grippers is insured both during engagement and disengagement, and during overrunning the grippers serve to support the spacers so that the spacers can function as bearing elements. Normally, tilting of grippers in the engaging direction is limited by engagement thereby with the races but in the event of excessive tilting for any cause, the grippers and spacers will nest together to limit tilting and to prevent damage to the spring 21. It is noted that in the overrunning condition, the grippers and spacers reach a solid nested condition before the spring 21 is bent far enough to damage it.

The resilient spacers 16 will maintain frictional contact with the races even in the event of wear and will act thru the series of grippers and spacers to tilt the grippers in both the engaging and disengaging direction even if frictional contact on the spacers 14 should become too light to accomplish this purpose effectively. Due to the spreading effect of friction on the end of the resilient spacers, they will exert a slightly greater force in the disengaging direction than in the engaging direction to insure that the grippers are tilted to full disengaging position, thereby to avoid wearing of flat spots on their outer surfaces. Upon a torque reversal, movement of the grippers toward their engaging position is assisted by the spring 21 so that a lighter frictional force in the spacers is sufficient.

Figures 4 and 5 illustrate an alternative construction in which the parts other than the grippers are substantially identical to those in Figures 1 to 3 and are indicated by the same reference numerals. In this construction, the spacers 14 and the special resilient spacers 16 alternate with grippers 22 having arcuate end portions formed about spaced centers to grip the races, when tilted in one direction and to release the races when tilted in the opposite direction. The grippers 22 have one flat side 23 and one convexly curved side 24 preferably formed by flat surfaces joined thru a relatively small arcuate surface. The spacers 14 may be identical with the spacers 14 of Figure 1 and preferably have their sides concavely grooved as indicated at 25. When the grippers and spacers are assembled the convex sides of the grippers extend into the concavely grooved sides of the spacers as shown in Figure 4 so that the spacers and grippers can tilt freely relative to each other thru a limited angle.

During overrunning of the races, the grippers and spacers will tilt clockwise until they reach a solidly nested condition in which the grippers support the spacers against further tilting to act as bearing elements between the races. Upon reversal of torque the spacers will assist in tilting the grippers to their engaged position in the same manner as described in Figure 1.

In Figure 1 the clutch is shown in its disengaged or overrunning position with the grippers and spacers nested solidly together so that the spacers function as bearings between the races. In Figure 4 the clutch is shown in a position of initial or light engagement. In this position the grippers have been tilted to engage the races, the tilting being assisted by engagement of the inner ends of the spacers with the inner ends of the grippers. Upon further loading of the races in the engaging direction the grippers and spacers may tilt somewhat further in a counterclockwise direction, the degree of tilting being limited by engagement of the grippers with the races.

Figure 6 illustrates a modified construction of spacers in which the spacer is formed of a tube 26 rolled or otherwise formed into a dumbbell shape with arcuate ends formed about the same center. The flat sides of the tube are pierced as indicated at 27 to provide openings to receive the annular spring 21 and the arcuate ends may be formed with oil grooves 28. Grippers of this type may be used interchangeably with the grippers 14 where the bearing loads are not too great. It is intended that in all operations the spacers shall function as rigid rather than yielding elements to carry bearing loads between the races during over running.

While several embodiments of the invention have been shown and described in detail it will be understood that these are illustrative only and are not to be taken as a definition of the scope of the invention, reference being had for this purpose to the appended claims.

What is claimed is:

1. A one-way clutch to connect inner and outer coaxial cylindrical races comprising a series of tiltable grippers between the races having their ends curved about spaced centers to wedge between and connect the races when tilted in one direction and to disengage the races for free relative rotation when tilted in the other direction, a series of spacers a majority of which are rigid between the races alternating with the grippers and having their ends curved about common centers, the ends of the spacers slidably engaging the races and the outer ends being of greater circumferential thickness than the inner ends, and the grippers and spacers tending to increase their circumferential dimension when tilted and nesting solidly together when the grippers are tilted in said other direction so that the grippers support the spacers to act as bearings between the races, certain of the spacers being formed of Z shaped strips with arcuate resilient ends engaging the races to maintain resilient frictional contact therewith.

2. The construction of claim 1 in which the arcuate ends of the Z shaped spacers extend opposite the direction of relative movement of the races during over running so that they exert a greater frictional force on the races during overrunning than when the races are turning relative to each other in the opposite direction.

3. A one-way clutch to connect inner and outer coaxial cylindrical races comprising a series of tiltable grippers between the races having their ends curved about spaced centers to wedge between and connect the races when tilted in one direction and to disengage the races for free relative rotation when tilted in the other direction, a series of rigid spacers between the races alternating with the grippers and having their ends curved about common centers, the ends of the spacers slidably engaging the races and the outer ends being of greater circumferential thickness than the inner ends, each of the grippers having one flat side and one convexly projecting side, each of the spacers having one concavely curved side to receive the convexly projecting side of the adjacent gripper and the spacers engaging the sides of the grippers adjacent to the races to tilt the grippers as the spacers are tilted by frictional engagement with the races, the grippers and spacers tending to increase their circumferential dimension when tilted and nesting solidly together when the grippers are tilted in said other direction so that the grippers support the spacers to act as bearings between the races.

4. A one-way clutch to connect inner and outer coaxial cylindrical races comprising a series of tiltable grippers between the races having their ends curved about spaced centers to wedge between and connect the races when tilted in one direction and disengage the races for free relative rotation when tilted in the other direction, bearing means to maintain the coaxial relationship between said races comprisnig a series of rigid, generally dumbbell shaped spacers between the races interspersed between the grippers and each spacer having radially spaced ends curved about a common center located within the spacer, said grippers and spacers being constructed and arranged so that said spacers engage and space the races to maintain the coaxial relationship therebetween when said grippers are tilted in said other direction and disengage the races.

5. A one-way clutch to connect inner and outer coaxial cylindrical races comprising a series of tiltable grippers between the races having their ends curved about spaced centers to wedge between and connect the races when tilted in one direction and to disengage the races for free relative rotation when tilted in the other direction, bearing means to maintain the coaxial relationship between said races comprising a series of spacers a majority of which are rigid between the races alternating with the grippers and having their ends curved about common centers, said spacers being constructed and arranged so that the ends of the spacers slidably engage the races and the outer ends being of greater circumferential thickness than the inner ends, certain of said spacers being Z-shaped strips with arcuate resilient ends frictionally engaging the races to maintain resilient frictional contact therewith, the grippers and spacers having means defining circumferential openings therethrough, an annular spring extending through the openings, the openings in the grippers being of such a size and lying at such an angle that when they are tilted in said other direction they will bend the spring laterally and the openings in the spacers being of such size and shape that they will clear the spring in all working positions thereof, the grippers and spacers being constructed and arranged to nest solidly together with said spacers in engagement with the races to limit tilting thereby to prevent excessive bending of the spring and so that the grippers support the spacers to act as bearings between the races when the grippers are tilted in said other direction.

6. A one-way clutch to connect inner and outer coaxial cylindrical races comprising a series of tiltable grippers between the races having their ends curved about spaced centers to wedge between and connect the races when tilted in one direction and to disengage the races for free relative rotation when tilted in the other direction, bearing means to maintain the coaxial relationship between said races comprising a series of spacers a majority of which are rigid between the races alternating with the grippers and having their ends curved about common centers, said spacers being constructed and arranged so that the ends of the spacers slidably engage the races and the outer ends being of greater circumferential thickness than the inner ends, certain of said spacers being Z-shaped strips with arcuate resilient ends extending opposite to the direction of relative movement of the races during overrunning and frictionally engaging the races to exert a greater frictional force thereon in the overrunning direction than in the opposite direction, the grippers and spacers having means defining circumferential openings therethrough, an annular spring extending through the openings, the openings in the grippers being of such a size and lying at such an angle that when they are tilted in said other direction they will bend the spring laterally and the openings in the spacers being of such size and shape that they will clear the spring in all working positions thereof, the grippers and spacers being constructed and arranged to nest solidly together with said spacers in engagement with the races to limit tilting thereby to prevent excessive bending of the spring and so that the grippers support the spacers to act as bearings between the races when the grippers are tilted in said other direction.

References Cited in the file of this patent

UNITED STATES PATENTS

| | | |
|---|---|---|
| 2,364,280 | Dodge | Dec. 5, 1944 |
| 2,614,669 | Dodge | Oct. 21, 1952 |